(12) United States Patent
Liu (10) Patent No.: US 11,418,945 B2
(45) Date of Patent: Aug. 16, 2022

(54) INFORMATION PROCESSING METHOD FOR RF DEVICE AND MOBILE TERMINAL

(71) Applicant: VIVO MOBILE COMMUNICATION CO., LTD., Chang'an Dongguan (CN)

(72) Inventor: Dingqiu Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 99 days.

(21) Appl. No.: 16/762,637

(22) PCT Filed: Oct. 29, 2018

(86) PCT No.: PCT/CN2018/112409
§ 371 (c)(1),
(2) Date: May 8, 2020

(87) PCT Pub. No.: WO2019/091301
PCT Pub. Date: May 16, 2019

(65) Prior Publication Data
US 2020/0280841 A1    Sep. 3, 2020

(30) Foreign Application Priority Data
Nov. 9, 2017 (CN) .......................... 201711097749.2

(51) Int. Cl.
*H04M 3/00* (2006.01)
*H04W 8/22* (2009.01)
(Continued)

(52) U.S. Cl.
CPC ................ *H04W 8/22* (2013.01); *H04B 1/40* (2013.01); *H04W 76/10* (2018.02)

(58) Field of Classification Search
CPC ... H04W 8/22; H04W 76/10; H04W 42/0235; H04W 56/001; H04B 1/40; G06F 13/36;
(Continued)

(56) References Cited

U.S. PATENT DOCUMENTS 5,745,268 A * 4/1998 Eastvoid ................ G16H 40/67
398/25
6,484,093 B1 * 11/2002 Ito .......................... G01C 21/34
340/990

(Continued)

FOREIGN PATENT DOCUMENTS

| CN | 106933770 A | 7/2017 |
| CN | 107979385 A | 5/2018 |
| WO | 2017136066 A1 | 8/2017 |

OTHER PUBLICATIONS

International Search Report & Written Opinion related to Application No. PCT/CN2018/112409; reported on Jan. 18, 2019.
(Continued)

*Primary Examiner* — Stephen M D Agosta
(74) *Attorney, Agent, or Firm* — von Briesen & Roper, s.c.

(57) ABSTRACT

An information processing method for a RF device and a mobile terminal are provided. The method applied to a first RF device includes: transmitting RFFE data to a second RF device; transmitting an RFFE trigger instruction to the second RF device when transmission of the RFFE data is completed, to enable the second RF device to execute command information included in the REFE data and written to a register according to the RFFE trigger instruction.

5 Claims, 3 Drawing Sheets

--- transmitting RFFE data to a second RF device, wherein the RFFE data includes command information to be written to a corresponding register in the second RF device — 101 transmitting an RFFE trigger instruction to the second RF device when transmission of the RFFE data is completed, to enable the second RF device to execute the command information in the register according to the RFFE trigger instruction — 102

(51) Int. Cl.
*H04W 76/10* (2018.01)
*H04B 1/40* (2015.01)

(58) Field of Classification Search
CPC ............ G06F 13/4022; G06F 13/4068; G06F 13/4272; G06F 13/4282; H04L 7/02
See application file for complete search history.

(56) References Cited

U.S. PATENT DOCUMENTS

| | | | | |
|---|---|---|---|---|
| 8,521,101 | B1* | 8/2013 | Kadam | H04L 7/04 375/350 |
| 2009/0161655 | A1* | 6/2009 | Uppala | H04W 56/00 370/350 |
| 2013/0262710 | A1* | 10/2013 | Luo | G01C 21/26 710/9 |
| 2015/0055720 | A1* | 2/2015 | Lin | G06F 13/128 375/259 |
| 2016/0242057 | A1* | 8/2016 | Ripley | H04L 12/40032 |
| 2017/0118125 | A1* | 4/2017 | Mishra | H04L 69/164 |
| 2017/0124013 | A1* | 5/2017 | Vaillancourt | G06F 13/4022 |
| 2017/0192918 | A1 | 7/2017 | Tenbroek et al. | |
| 2017/0192933 | A1* | 7/2017 | Banowetz | G06F 13/4291 |
| 2017/0223646 | A1 | 8/2017 | Romera et al. | |
| 2017/0272108 | A1* | 9/2017 | Filipovic | H04B 1/0458 |
| 2017/0277651 | A1* | 9/2017 | Ngo | G06F 13/364 |
| 2018/0074985 | A1* | 3/2018 | Mishra | G06F 13/4247 |
| 2019/0073327 | A1* | 3/2019 | Mishra | G06F 13/4291 |

OTHER PUBLICATIONS

Extended European Search Report for related Application No. 18877045.7; reported on Nov. 9, 2020.

Reema Sidhwani, "Antenna tuning for WCDMA RF front end", Aalto Univeristy School of Electrical Engineering, Nov. 11, 2020, pp. 1-70.

* cited by examiner

INFORMATION PROCESSING METHOD FOR RF DEVICE AND MOBILE TERMINAL

CROSS-REFERENCE TO RELATED APPLICATION

This patent application is a 35 USC § 371 U.S. national stage of International Application No. PCT/CN2018/112409 filed on Oct. 29, 2018, which claims a priority of the Chinese Patent Application No. 201711097749.2 filed on Nov. 9, 2017, the disclosures of which are incorporated herein by reference in their entireties.

TECHNICAL FIELD

The present disclosure relates to the field of communication technology, and in particular, to an information processing method for a Radio Frequency (RF) device and a mobile terminal.

BACKGROUND

In an early RF system, a digital logic part of each RF device is controlled by a General Radio Frequency Control (GRFC) port, and the controlling of each RF device requires multiple control ports according to the logic required by each device. With the development of technology, the RF system is becoming more and more complex, and the number of RF devices is increasing. A resource of the GRFC port has become a bottleneck in design.

An RF Front-End (RFFE) control interface protocol is a part of a Mobile Industry Processor Interface (MIPI) protocol, which is customized by the MIPI organization for the RF device. According to the RFFE protocol, a pair of RFFE control lines are able to control multiple devices conforming to the RFFE protocol, which save hardware resources and has been widely used in the RF hardware design.

A basic operation process of the RFFE protocol is as follows: the RFFE controller transmits a Sequency Start Condition (SSC), identifies a device to be read from and written to by a User Service Identification (USID), and then writes data and commands and related parity check data to a register of a specified device. The RFFE protocol specifies that a command of the register is executed only after the RFFE controller transmits a control command when all commands and data have been prepared.

In general, after an RFFE trigger signal is generated, the relevant RF device is able to timely complete various commands within the t time interval to avoid damage to the RF device by a RF high-power signal. However, some devices need a relatively long time to implement the switching operation, and the switching operation cannot be timely completed within the predetermined time t, so that the RF high-power signal may arrive before the RF device is ready, which may adversely affect a reliability of the RF device.

SUMMARY

According to a first aspect, an embodiment of the present disclosure provides an information processing method for a RF device, wherein the information processing method is applied to a first RF device and includes: transmitting RFFE data to a second RF device, wherein the RFFE data includes command information to be written to a corresponding register in the second RF device; transmitting an RFFE trigger instruction to the second RF device when transmission of the RFFE data is completed, to enable the second RF device to execute the command information in the register according to the RFFE trigger instruction.

According to a second aspect, an embodiment of the present disclosure further provides an information processing method for a RF device, wherein the information processing method is applied to a second RF device and includes: receiving RFFE data transmitted by a first RF device, wherein the RFFE data includes: command information to be written to a corresponding register in the second RF device; receiving an RFFE trigger instruction transmitted by the first RF device when reception of the REFE data is completed, and executing the command information in the register according to the RFFE trigger instruction.

According to a third aspect, an embodiment of the present disclosure provides a mobile terminal, including: a first transmitting module, configured to transmit RFFE data to a second RF device, wherein the RFFE data includes command information to be written to a corresponding register in the second RF device; a second transmitting module, configured to transmit an RFFE trigger instruction to the second RF device when transmission of the RFFE data is completed, to enable the second RF device to execute the command information in the register according to the RFFE trigger instruction.

According to a fourth aspect, an embodiment of the present disclosure further provides a mobile terminal, including: a first receiving module, configured to receive RFFE data transmitted by a first RF device, wherein the RFFE data includes command information to be written to a corresponding register in the second RF device; a second receiving module, configured to receive an RFFE trigger instruction transmitted by the first RF device when reception of the RFFE data is completed, and execute the command information in the register according to the RFFE trigger instruction.

According to a fifth aspect, an embodiment of the present disclosure further provides a mobile terminal including a processor, a memory, and a computer program stored in the memory and capable of being executed by the processor, wherein the processor is configured to execute the computer program to implement the above-described information processing method for the RF device.

According to a sixth aspect, an embodiment of the present disclosure provides a computer-readable storage medium storing therein a computer program, wherein the computer program is configured to be executed by a processor, to implement the above-described information processing method for the RF device.

BRIEF DESCRIPTION OF THE DRAWINGS

The technical solutions in the embodiments of the present disclosure will be described more clearly and completely below in connection with the accompanying drawings in the embodiments of the present disclosure, and it will be apparent that the described embodiments are a part, but not all, of the embodiments of the present disclosure. Based on the embodiments in the present disclosure, all other embodiments obtained by a person of ordinary skill in the art without involving any inventive effort are within the protection scope of the present disclosure.

DETAILED DESCRIPTION

The technical solutions in the embodiments of the present disclosure will be described more clearly and completely below in connection with the accompanying drawings in the embodiments of the present disclosure, and it will be apparent that the described embodiments are a part, but not all, of the embodiments of the present disclosure. Based on the embodiments in the present disclosure, all other embodiments obtained by a person of ordinary skill in the art without involving any inventive effort are within the protection scope of the present disclosure.

Figure 1:
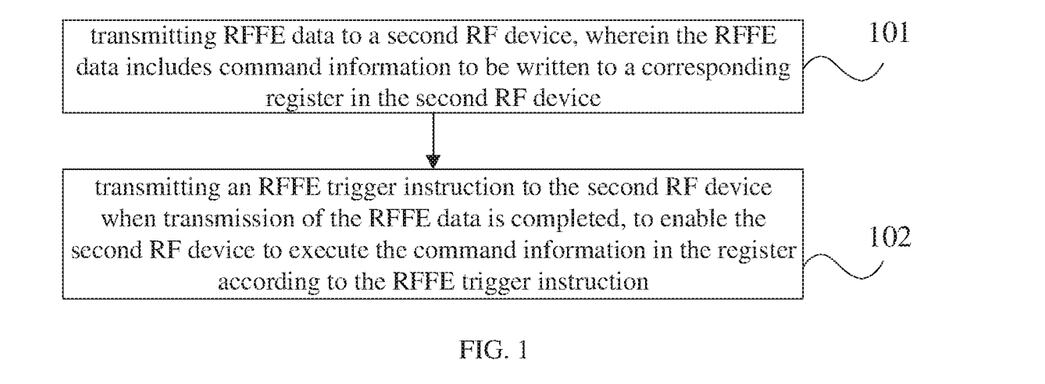
FIG. 1 is a schematic diagram of an information processing method for a RF device according to an embodiment of the present disclosure.

As shown in FIG. 1, an embodiment of the present disclosure provides an information processing method for a RF device, the information processing method is applied to a first RF device and includes following steps.

Step 101: transmitting RFFE data to a second RF device, wherein the RFFE data includes command information to be written to a corresponding register in the second RF device.

A first RF device of the mobile terminal transmits RFFE data to a second RF device, wherein the first RF device is a master device, the second RF device is a slave device, and the RFFE data transmitted by the first RF device to the second RF device includes data information and command information to be written to a corresponding register in the second RF device.

The step of transmitting RFFE data to the second RF device includes: transmitting the command information to the second RF device after establishing a connection with the second RF device; transmitting data information included in the RFFE data to the second RF device after transmission of the command information is completed.

That is, for the data information and the command information included in the RFFE data, the first RF device firstly transmits the command information to the second RF device, so that the second RF device writes the command information into the corresponding register after receiving the command information. After the first RF device transmits the command information to the second RF device, the first RF device proceeds to transmit the data information to the second RF device. After the transmission of the data information is completed, it can be determined that the transmission of the RFFE data is completed.

Step 102: transmitting an RFFE trigger instruction to the second RF device when transmission of the RFFE data is completed, to enable the second RF device to execute the command information in the register according to the RFFE trigger instruction.

After the first RF device has transmitted the RFFE data to the second RF device, the first RF device transmits an RFFE trigger instruction to the second RF device, so that the second RF device controls the register to execute the command information according to the RFFE trigger instruction. When the register executes the command information, it is necessary to execute the command information based on the data information received by the second RF device.

The step of transmitting the RFFE trigger instruction to the second RF device when the transmission of the RFFE data is completed to enable the second RF device to execute the command information in the register according to the RFFE trigger instruction includes: transmitting notification information to the second RF device when the transmission of the RFFE data is completed, and receiving feedback information transmitted by the second RF device in response to the notification information, wherein the feedback information indicates that reception of the RFFE data is completed; transmitting the RFFE trigger instruction to the second RF device after receiving the feedback information transmitted by the second RF device, wherein the RFFE trigger instruction is used to enable the second RF device to control the register execute the command information.

After the first RF device transmits the RFFE data to each of the second RF devices, the first RF device transmits a notification message informing the second RF device that the transmission of the RFFE data has been completed. After the second RF device receives the notification message, the second RF device checks whether the reception of the RFFE data is completed. When the second RF device has received the RFFE data, the second RF device generates feedback information in response to the notification information, and transmits the feedback information to the first RF device. After receiving the feedback information of the second RF device, the first RF device may execute a process of transmitting the RFFE trigger instruction to each of the second RF devices, and after transmitting the RFFE trigger instructions to the second RF device, the second RF device may control the register to execute the written command information according to the RFFE trigger instruction. Some of the second RF devices may transmit feedback information according to the notification information.

For a second RF device that does not transmit feedback information, an RFFE trigger instruction is transmitted to the second RF device immediately after the first RF device has transmitted RFFE data to the second RF device.

In the embodiment of the present disclosure, the method further includes: transmitting the RFFE trigger instruction to the second RF device again after a preset time interval since the RFFE trigger instruction has been transmitted to the second RF device.

The first RF device transmits the RFFE trigger instruction to the second RF device, and after the second RF device controls the register to execute the command information according to the RFFE trigger instruction, the first RF device further needs to transmit the RFFE trigger instruction to the second RF device after a preset time interval, wherein the RFFE trigger instruction transmitted at this time is the corresponding RFFE trigger instruction in the protocol of the related art. In the embodiment of the present disclosure, on the basis of the flow in the related art, a process of transmitting an RFFE trigger instruction is added, wherein time for implementing the added process of transmitting an RFFE trigger instruction is after the transmission of the RFFE data is completed.

In the related art, there is a relative long time interval between the time of the completion of the transmission of the RFFE data and the time of the transmission of the RFFE trigger instruction, in which the command information is not executed during this time interval due to the fact that the first RF device does not transmit the RFFE trigger instruction during the time interval, which wastes a long period of time and slows down the switching speed of the RFFE device. In view of the above, the technical solution of the present disclosure uses the time interval between the time when the RFFE data transmission is completed and the time of transmitting the RFFE trigger instruction, to increase one transmission of an RFFE trigger instruction, that is, the RFFE trigger instruction is transmitted to the second RF device as soon as the first RF device completes transmission of the RFFE data, so that command information written in the register of the second RF device can be executed immediately, and it is determined that the RFFE device is ready for related operation before the RF power signal arrives, thereby ensuring the reliability of the device.

The technical solution of the present disclosure does not destroy the protocol in the related art, and one transmission of the RFFE trigger instruction is added to the protocol in the related art, so that it solves the problem in the related art that a reliability of the RF device may be adversely affected when the RF power signal is transmitted because the RF device is not completely ready.

According to the embodiment of the present disclosure, the RFFE data is transmitted from the first RF device to the second RF device, and the RFFE trigger instruction is transmitted from the first RF device to the second RF device when the transmission of the RFFE data is completed, so that the second RF device executes the command information included in the RFFE data and written into the register according to the RFFE trigger instruction, thereby increasing the time interval between the time of preparation of the RFFE data and time of the arrival of the power signal, improving the execution efficiency of the RFFE protocol, increasing the execution time of the RFFE command, and ensuring the reliability of the RF device.

Figure 2:
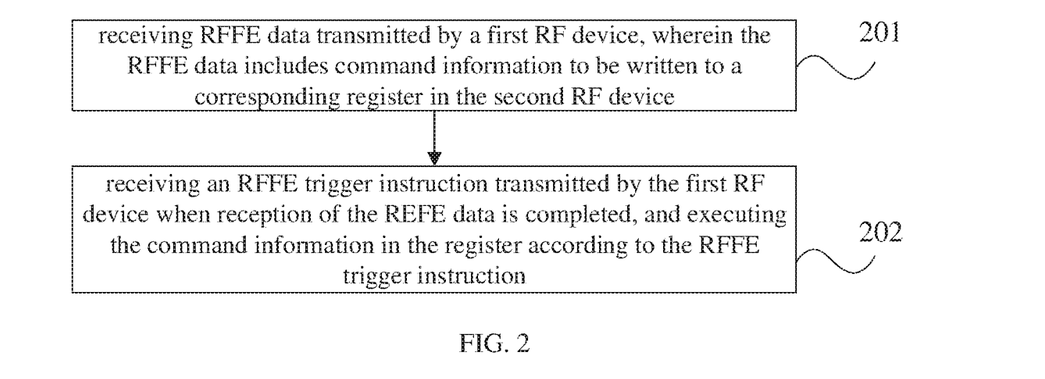
FIG. 2 is another schematic diagram showing an information processing method for a RF device according to an embodiment of the present disclosure.

As shown in FIG. 2, an embodiment of the present disclosure further provides an information processing method for a RF device, which is applied to a second RF device and includes following steps.

Step 201: receiving RFFE data transmitted by a first RF device, wherein the RFFE data includes command information to be written to a corresponding register in the second RF device.

The second RF device of the mobile terminal receives the RFFE data transmitted by the first RF device, wherein the second RF device is a slave device, the first RF device is a master device, and the RFFE data that is transmitted by the first RF device and received by the second RF device includes data information and command information to be written by the first RF device to a corresponding register in the second RF device.

The step of receiving the RFFE data transmitted by the first RF device includes: receiving the command information transmitted by the first RF device after establishing a connection with the first RF device, and writing the command information into the register; receiving data information included in the RFFE data transmitted by the first RF device after the reception of the command information is completed.

That is, after the second RF device establishes a connection with the first RF device, the second RF device firstly receives the command information preferentially transmitted by the first RF device, and after the second RF device receives the command information, the second RF device writes the command information into a corresponding register. Then the second RF device receives the data information transmitted by the first RF device. When the reception of the data is completed, it can be determined that the transmission of the RFFE data is completed.

Step 202: receiving an RFFE trigger instruction transmitted by the first RF device when reception of the REFE data is completed, and executing the command information in the register according to the RFFE trigger instruction.

After the second RF device receives the RFFE data transmitted by the first RF device, the second RF device receives the RFFE trigger instruction transmitted by the first RF device. After receiving the RFFE trigger instruction, the second RF device controls the register to execute the command information according to the RFFE trigger instruction. When the register executes the command information, it is necessary to execute the command information based on the data information received by the second RF device.

The step of receiving the RFFE trigger instruction transmitted by the first RF device when the reception of the REFE data is completed, and executing the command information in the register according to the RFFE trigger instruction includes: receiving notification information transmitted by the first RF device when the reception of the REFE data is completed, and transmitting feedback information to the first RF device, wherein the feedback information is in response to the notification information and indicates that reception of the RFFE data is completed; receiving the RFFE trigger instruction transmitted by the first RF device after transmitting the feedback information to the first RF device, and controlling the register to execute the command information according to the RFFE trigger instruction.

After receiving the RFFE data transmitted by the first RF device, the each of the second RF devices receives the notification information transmitted by the first RF device. According to the notification information, it may know that the transmission of the RFFE data is completed. After receiving the notification information, the second RF device checks whether the reception of the RFFE data is completed. When the second RF device has received the RFFE data, the second RF device generates feedback information in response to the notification information, and transmits the feedback information to the first RF device, such that the first RF device to transmit the RFFE trigger instruction to each of the second RF devices after receiving the feedback information, and the second RF device control the register to execute the written command information according to the RFFE trigger instruction after receiving the RFFE trigger instruction. Some of the second RF devices may transmit feedback information according to the notification information.

For a second RF device that does not transmit feedback information, an RFFE trigger instruction is transmitted to the second RF device immediately after the first RF device has transmitted RFFE data to the second RF device.

In the embodiment of the present disclosure, the method further includes: receiving the RFFE trigger instruction transmitted by the first RF device again after a preset time interval since the RFFE trigger instruction transmitted by the first RF device has been received and the command information in the register has been executed according to the RFFE trigger instruction.

After the second RF device receives the RFFE trigger instruction transmitted by the first RF device, and control the register to execute the command information according to the RFFE trigger instruction, the second RF device further needs to receive the RFFE trigger instruction transmitted by the first RF device after a preset time interval, wherein the RFFE trigger instruction received at this time is the corresponding RFFE trigger instruction in the protocol of the related art. In the embodiment of the present disclosure, on the basis of the flow in the related art, a process of transmitting an RFFE trigger instruction is added, wherein time for implementing the added process of transmitting an RFFE trigger instruction is after the transmission of the RFFE data is completed.

According to the technical solution of the present disclosure, on the basis of, instead of destroying, the protocol of the related art, it uses the time interval between the time when the RFFE data transmission is completed and the time of transmitting the RFFE trigger instruction, to increase one transmission of an RFFE trigger instruction, that is, the RFFE trigger instruction is transmitted to the second RF device as soon as the first RF device completes transmission of the RFFE data, so that command information written in the register of the second RF device can be executed immediately, and it is determined that the RFFE device is ready for related operation before the RF power signal arrives, thereby ensuring the reliability of the device.

According to the embodiment of the present disclosure, the RFFE data transmitted from the first RF device is received by the second RF device, and the RFFE trigger instruction transmitted from the first RF device is received by the second RF device when the reception of the RFFE data is completed, so that the second RF device executes the command information included in the RFFE data and written into the register according to the RFFE trigger instruction, thereby increasing the time interval between the time of preparation of the RFFE data and time of the arrival of the power signal, improving the execution efficiency of the RFFE protocol, increasing the execution time of the RFFE command, and ensuring the reliability of the RF device.

Figure 3:
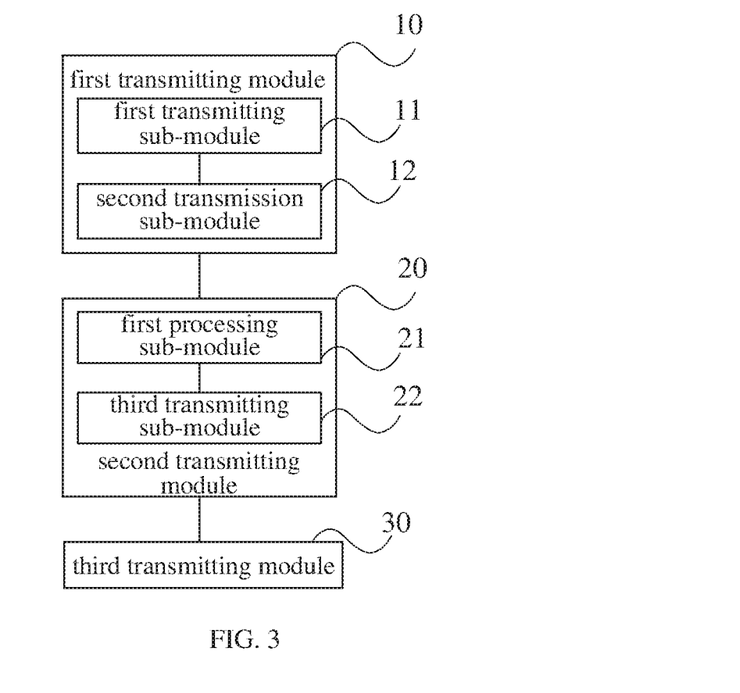
FIG. 3 is a schematic diagram of a mobile terminal according to an embodiment of the present disclosure.

An embodiment of the present disclosure provides a mobile terminal, as shown in FIG. 3, including: a first transmitting module 10 configured to transmit RFFE data to a second RF device, wherein the RFFE data includes command information to be written to a corresponding register in the second RF device; a second transmitting module 20 configured to transmit an RFFE trigger instruction to the second RF device when transmission of the RFFE data is completed, to enable the second RF device to execute the command information in the register according to the RFFE trigger instruction.

The first transmitting module 10 includes: a first transmitting sub-module 11 configured to transmit the command information to the second RF device after establishing a connection with the second RF device; a second transmission sub-module 12 configured to transmit data information included in the RFFE data to the second RF device after transmission of the command information is completed.

The second transmitting module 20 includes: a first processing sub-module 21 configured to transmit notification information to the second RF device when the transmission of the RFFE data is completed, and receiving feedback information transmitted by the second RF device in response to the notification information, wherein the feedback information indicates that reception the RFFE data is completed; a third transmitting sub-module 22 configured to transmit an RFFE trigger instruction to the second RF device after receiving the feedback information transmitted by the second RF device, wherein the RFFE trigger instruction is used to enable the second RF device to control the register to execute the command information.

The mobile terminal further includes: a third transmitting module 30 configured to transmit, after a preset time interval since the second transmitting module 20 has transmitted the RFFE trigger instruction to the second RF device, the RFFE trigger instruction to the second RF device again.

Figure 4:
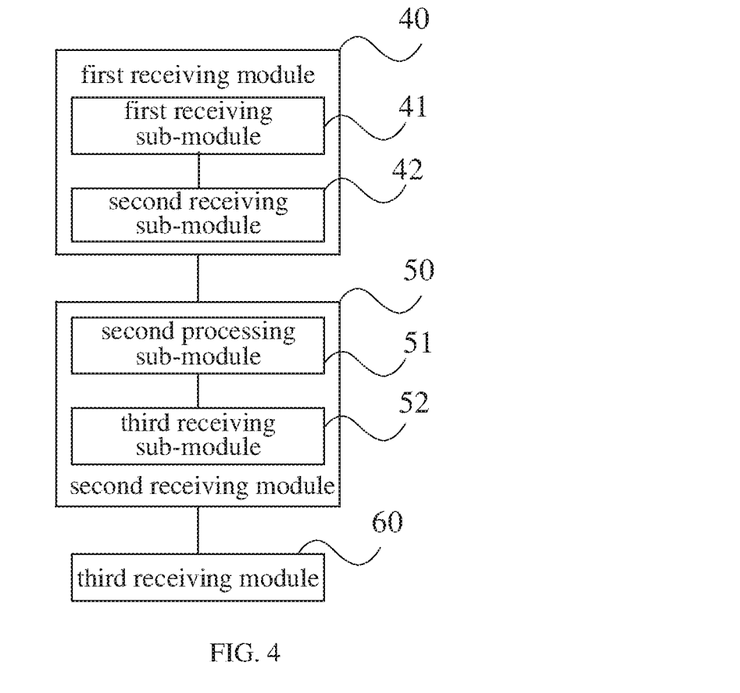
FIG. 4 is another schematic diagram of a mobile terminal according to an embodiment of the present disclosure.

An embodiment of the present disclosure further provides a mobile terminal, as shown in FIG. 4, including: a first receiving module 40 configured to receive RFFE data transmitted by a first RF device, wherein the RFFE data includes command information to be written to a corresponding register in the second RF device; a second receiving module 50 configured to receive an RFFE trigger instruction transmitted by the first RF device when reception of the REFE data is completed, and execute the command information in the register according to the RFFE trigger instruction.

The first receiving module 40 includes: a first receiving sub-module 41 configured to receive the command information transmitted by the first RF device after establishing a connection with the first RF device, and write the command information into the register; a second receiving sub-module 42 configured to receive data information included in the RFFE data transmitted by the first RF device after the reception of the command information is completed.

The second receiving module 50 includes: a second processing sub-module 51 configured to receive notification information transmitted by the first RF device when the reception of the REFE data is completed, and transmitting feedback information to the first RF device, wherein the feedback information is in response to the notification information and indicates that reception of the RFFE data is completed; a third receiving sub-module 52 configured to receive the RFFE trigger instruction transmitted by the first RF device after transmitting the feedback information to the first RF device, and control the register to execute command information according to the RFFE trigger instruction.

The mobile terminal further includes: a third receiving module 60 configured to receive the RFFE trigger instruction transmitted by the first. RF device again after a preset time interval since the second receiving module 50 has received the RFFE trigger instruction transmitted by the first RF device, and has executed the command information in the register according to the RFFE trigger instruction.

The mobile terminal of the embodiment of the present disclosure is capable of implementing the various processes implemented by the mobile terminal in the method embodiments of FIG. 1 and FIG. 2. To avoid repetition, details thereof are not described herein.

Figure 5:
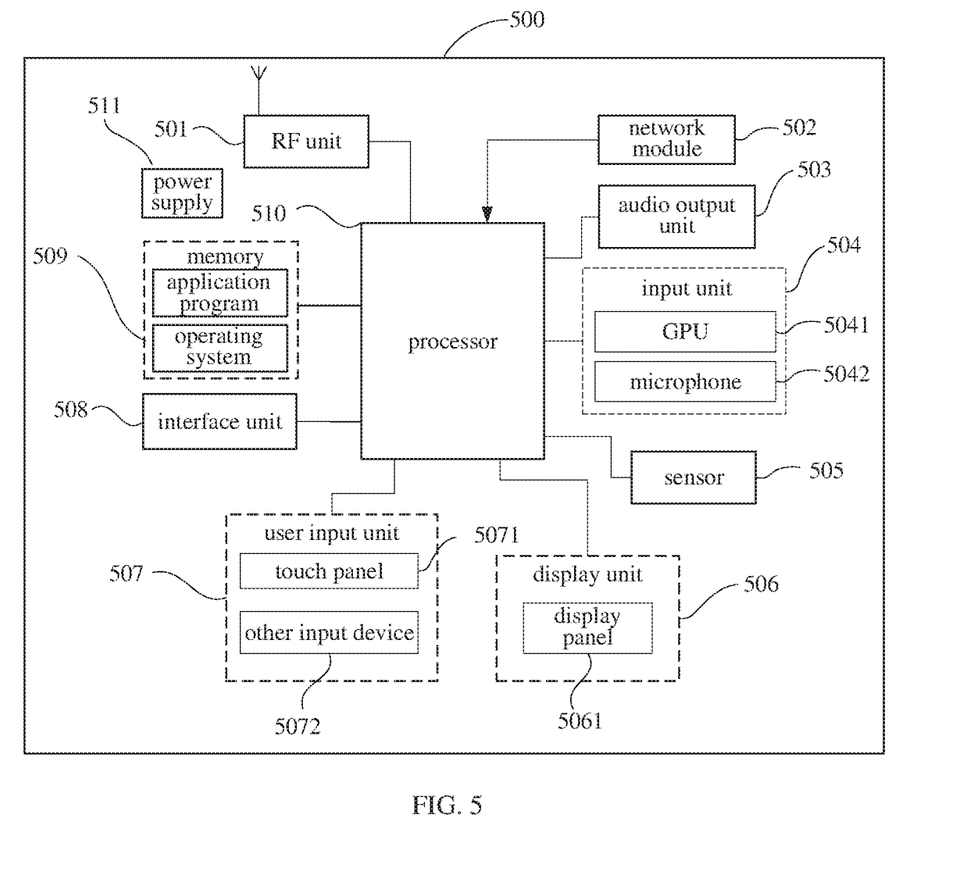
FIG. 5 shows a schematic diagram of a hardware structure of a mobile terminal according to an embodiment of the present disclosure.

In this way, the RFFE data is transmitted from the first RF device to the second RF device, and the RFFE trigger instruction is transmitted from the first RF device to the second RF device when the transmission of the RFFE data is completed, so that the second RF device executes the command information included in the RFFE data and written into the register according to the RFFE trigger instruction, thereby increasing the time interval between the time of preparation of the RFFE data and time of the arrival of the power signal, improving the execution efficiency of the RFFE protocol, increasing the execution time of the RFFE command, and ensuring the reliability of the RF device, FIG. 5 is a schematic diagram of a hardware structure of a mobile terminal 500, the mobile terminal 500 includes, but not limited to, a RF unit 501, a network module 502, an audio output unit 503, an input unit 504, a sensor 505, a display unit 506, a user input unit 507, an interface unit 508, a memory 509, a processor 510, and a power supply 511. It will be appreciated by a person of ordinary skill in the art that the mobile terminal structure shown in FIG. 5 does not constitute a definition of a mobile terminal, which may include more or fewer components than illustrated, or some components may be combined, or the components may be arranged in a different manner. In the embodiment of the present disclosure, the mobile terminal includes, but is not limited to, a mobile phone, a tablet computer, a notebook computer, a palmtop computer, a vehicle-mounted terminal, a wearable device, a pedometer, and the like.

The RF unit 501 is configured to transmit RFFE data to a second RF device, wherein the RFFE data includes command information to be written to a corresponding register in the second RF device; transmit an RFFE trigger instruction to the second RF device when transmission of the RFFE data is completed, to enable the second RF device to execute the command information in the register according to the RFFE trigger instruction.

Optionally, when transmitting RFFE data to the second RF device, the RF unit 501 is further configured to perform steps of transmitting the command information to the second RF device after establishing a connection with the second RF device; transmitting data information included in the RFFE data to the second RF device after transmission of the command information is completed.

Optionally, when transmitting the RFFE trigger instruction to the second RF device when the transmission of the RFFE data is completed to enable the second RF device to execute the command information in the register according to the RFFE trigger instruction, the RF unit 501 is further configured to perform following steps: transmitting notification information to the second RF device when the transmission of the RFFE data is completed, and receiving feedback information transmitted by the second RF device in response to the notification information, wherein the feedback information indicates that reception of the RFFE data is completed; transmitting the RFFE trigger instruction to the second RF device after receiving the feedback information transmitted by the second RF device, wherein the RFFE trigger instruction is used to enable the second RF device to control the register to execute the command information.

Optionally, after transmitting the RFFE trigger instruction to the second RF device, the RF unit 501 is further configured to perform a step of transmitting the RFFE trigger instruction to the second RF device again after a preset time interval.

In this way, the RFFE data is transmitted from the first RF device to the second RF device, and the RFFE trigger instruction is transmitted from the first RF device to the second RF device when the transmission of the RFFE data is completed, so that the second RF device executes the command information included in the RFFE data and written into the register according to the RFFE trigger instruction, thereby increasing the time interval between the time of preparation of the RFFE data and time of the arrival of the power signal, improving the execution efficiency of the RFFE protocol, increasing the execution time of the RFFE command, and ensuring the reliability of the RF device.

The RF unit 501 is further configured to receive RFFE data transmitted by a first RF device, wherein the RFFE data includes command information to be written to a corresponding register in the second RF device; and receive an RFFE trigger instruction transmitted by the first RF device when reception of the REFE data is completed, wherein the processor 510 is configured to execute the command information in the register according to the RFFE trigger instruction.

Optionally, when receiving the RFFE data transmitted by the first RF device, the RF unit 501 is further configured to perform following steps: receiving the command information transmitted by the first RF device after establishing a connection with the first RF device, and writing the command information into the register; receiving data information included in the RFFE data transmitted by the first RF device after the reception of the command information is completed.

Optionally, receiving the RFFE trigger instruction transmitted by the first RF device when the reception of the REFE data is completed, and executing the command information in the register according to the RFFE trigger instruction, the RF unit 501 is further configured to perform following steps: receiving notification information transmitted by the first RF device when the reception of the REFE data is completed, and transmitting feedback information to the first RF device, wherein the feedback information is in response to the notification information and indicates that reception of the RFFE data is completed; receiving the RFFE trigger instruction transmitted by the first RF device after transmitting the feedback information to the first RF device, wherein the controller 510 is configured to control the register to execute the command information according to the RFFE trigger instruction.

Optionally, after receiving the RFFE trigger instruction transmitted by the first RF device, and executing the command information in the register according to the RFFE trigger instruction, the RF unit 501 is further configured to perform a step of receiving the RFFE trigger instruction transmitted by the first RF device again after a preset time interval.

In this way, the RFFE data transmitted from the first RF device is received by the second RF device, and the RFFE trigger instruction transmitted from the first RF device is received by the second RF device when the reception of the RFFE data is completed, so that it executes the command information included in the RFFE data and written into the register according to the RFFE trigger instruction, thereby increasing the time interval between the time of preparation of the RFFE data and time of the arrival of the power signal, improving the execution efficiency of the RFFE protocol, increasing the execution time of the RFFE command, and ensuring the reliability of the RF device.

It should be appreciated that, in the embodiment of the present disclosure, the RF unit 501 may be configured to receive and transmit signals during receiving and transmitting information or a call. Specifically, the RF unit 501 receives downlink data from a base station, and then transmits the downlink data to the processor 510 for processing. In addition, the RF unit 501 may transmits the uplink data to the base station. Generally, the RF unit 501 includes, but is not limited to, an antenna, at least one amplifier, a transceiver, a coupler, a low noise amplifier, a duplexer, and the like. In addition, the RF unit 501 may also communicate with the network and other devices through a wireless communication system.

The mobile terminal provides wireless broadband Internet access to the user through the network module 502, such as assisting the user in receiving and transmitting an email, browsing a web page, and accessing streaming media, etc.

The audio output unit 503 may convert the audio data received by the RF unit 501 or the network module 502 or stored in the memory 509 into an audio signal and output as sound. Further, the audio output unit 503 may also provide audio output (e.g., sound for receiving a call signal, sound for receiving a message, etc.) related to a specific function performed by the mobile terminal 500. The audio output unit 503 includes a speaker, a buzzer, a receiver, and the like.

The input unit 504 is adapted to receive an audio or video signal. The input unit 504 may include a Graphics Processing Unit (GPU) 5041, which processes image data of still pictures or videos obtained by an image capturing apparatus (such as a camera) in a video capturing mode or an image capturing mode, and a microphone 5042. The processed image frame may be displayed on the display unit 506. The image frames processed by the GPU 5041 may be stored in memory 509 (or another storage medium) or transmitted via the RF unit 501 or the network module 502. The microphone 5042 can receive sound and can process such sound into audio data. In the case of a phone call mode, the processed audio data may be converted into a format output that may be transmitted to the mobile communication base station via the RF unit 501.

The mobile terminal 500 further includes at least one sensor 505, such as a light sensor, a motion sensor, and other sensors. Specifically, the light sensor includes an ambient light sensor that can adjust the brightness of the display panel 5061 according to the brightness of the ambient light, and a proximity sensor that can turn off the display panel 5061 and/or the backlight when the mobile terminal 500 moves to the ear. As one of the motion sensors, the accelerometer sensor can detect the magnitude of the acceleration in each direction (generally three axes), can detect the magnitude and direction of the gravity when being stationary, and can be configured to identify the attitude of the mobile terminal (such as horizontal/vertical display switching, related games, magnetometer attitude calibration), vibration identification related functions (such as pedometer, knocking), and the like; The sensor 505 may further include a fingerprint sensor, a pressure sensor, an iris sensor, a molecular sensor, a gyroscope, a barometer, a hygrometer, a thermometer, an infrared sensor, and the like, which are not further described herein.

The display unit 506 is configured to display information input by or provided to the user. The display unit 506 may include a display panel 5061, which may be configured in the form of a Liquid Crystal Display (Liquid Crystal Display, LCD), an Organic Light-Emitting Diode (Organic Light-Emitting Diode, OLED), or the like.

The user input unit 507 may be configured to receive the input number or character information and to generate key signal input related to the user setting and the function control of the mobile terminal. Specifically, the user input unit 507 includes a touch panel 5071 and another input device 5072. The touch panel 5071, also referred to as a touch screen, may collect touch operations on or near the user (e.g., operations on or near the touch panel 5071 using any suitable object or accessory, such as a finger of the user, stylus, or the like). The touch panel 5071 may include both a touch detection device and a touch controller. The touch detection device detects a position of touch of the user, detects a signal caused by the touch operation, and transmits the signal to the touch controller. The touch controller receives touch information from the touch detection device and converts the touch information into contact coordinates, and transmits the contact coordinates to the processor 510 to receive and execute commands transmitted from the processor 510. In addition, the touch panel 5071 may be implemented in various types such as a resistive type, a capacitive type, an infrared ray, and a surface acoustic wave. In addition to the touch panel 5071, the user input unit 507 may further include the other input device 5072. Specifically, the other input device 5072 may include, but are not limited to, a physical keyboard, a function key (such as a volume control key, a power key, or the like), a trackball, a mouse, or a joystick, Details thereof are not described herein.

Further, the touch panel 5071 may be overlaid on the display panel 5061, and when the touch panel 5071 detects a touch operation on or near the touch panel 5071, the touch panel 5071 transmits data of the touch operation to the processor 510 to determine a type of a touch event, and then the processor 510 provides a corresponding visual output on the display panel 5061 according to the type of the touch event. Although in FIG. 5, the touch panel 5071 and the display panel 5061 are implemented as two separate components to implement the input and output functions of the mobile terminal, in some embodiments, the touch panel 5071 and the display panel 5061 may be integrated to implement the input and output functions of the mobile terminal, which are not specifically limited herein.

The interface unit 508 is an interface where an external device is connected to the mobile terminal 500. For example, an external device may include a wired or wireless headset port, an external power (or battery charger) port, a wired or wireless data port, a memory card port, a port for connecting a device having an identification module, an audio Input/Output (I/O) port, a video I/O port, a headset port, and the like. The interface unit 508 may be configured to receive input (e.g., data information, power, etc.) from an external device and transmit the received input to one or more elements within the mobile terminal 500 or may be configured to transmit data between the mobile terminal 500 and the external device.

Memory 509 may be configured to store software programs and various data. The memory 509 may mainly include a program storage area and a data storage area, wherein the program storage area may store an operating system, an application program (such as an audio play function, an image play function, and the like) required by at least one function, and the like, and the data storage area may store data (such as audio data, a phone book, and the like) created according to use of the mobile phone, and the like. In addition, the memory 509 may include high speed random access memory, and may further include non-volatile memory, such as at least one of a magnetic disk storage device, a flash memory device, or another volatile solid-state storage device.

The processor 510 is a control center of the mobile terminal, connects various parts of the entire mobile terminal by various interfaces and lines, executes various functions of the mobile terminal and processes data by running or executing software programs and/or modules stored in the memory 509 and using data stored in the memory 509, thereby performing overall monitoring of the mobile terminal. The processor 510 may include one or more processing units. Optionally, the processor 510 may integrate an application processor and a modem processor, wherein the application processor mainly processes an operating system, a user interface, an application program, and the like, and the modem processor mainly implements wireless communication. It will be appreciated that the modem processor described above may alternatively not be integrated into the processor 510.

The mobile terminal 500 may further include a power supply 511 (such as a battery) that supplies power to the various components. Optionally, the power supply 511 may be logically connected to the processor 510 through a power management system to perform functions such as charging management, discharging management, and power consumption management through the power management system.

In addition, the mobile terminal 500 may further include functional modules that are not shown, and details thereof are not described herein.

Optionally, an embodiment of the present disclosure further provides a mobile terminal including a processor 510, a memory 509, and a computer program stored in the memory 509 and capable of being executed by the processor 510. The processor 510 is configured to execute the computer program to implement various processes of the photographing method embodiments, and achieve the same technical effect. To avoid repetition, details thereof are not described herein.

An embodiment of the present disclosure further provides a computer readable storage medium storing therein a computer program. When being executed by a processor, the computer program implements various processes of the above-described photographing method embodiments, and achieves the same technical effect. To avoid repetition, details thereof are not described herein. The computer readable storage medium includes a Read-Only Memory (ROM), a Random Access Memory (RAM), a magnetic disk, an optical disk, or the like.

It should be appreciated that, in the present disclosure, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. Unless otherwise defined, the element defined by the term "including a . . ." does not rule out the possibility that there are additional identical elements in the procedure, method, article or device including the element.

From the above description of the embodiments, it will be apparent to a person of ordinary skill in the art that the method of the above embodiments may be implemented by means of software plus the necessary general hardware platform, or may be implemented by means of hardware, but in many cases the former is more preferable. Based on this understanding, the technical solution of the present disclosure essentially, or a part that contributes to the related art may be embodied in a form of a software product. The computer software product is stored in a storage medium (a ROM, a RAM, a magnetic disk, or an optical disk) and includes instructions for causing a computer device (for example, a mobile phone, a computer, a server, an air conditioner, or a network device) to perform the methods described in various embodiments of the present disclosure.

The embodiments of the present disclosure have been described above in connection with the accompanying drawings, but the present disclosure is not limited to the specific embodiments described above. The specific embodiments described above are merely illustrative and not restrictive. Under the teaching of the present disclosure, a person of ordinary skill in the art may make many modifications without departing from the spirit of the disclosure and the scope of the claims, all of which fall within the protection of the disclosure.

What is claimed is:

1. An information processing method for a Radio Frequency (RF) device, wherein the information processing method is applied to a first RF device and comprises:
   transmitting RF Front-End (RFFE) data to a second RF device, wherein the RFFE data comprises command information to be written to a corresponding register in the second RF device;
   transmitting an RFFE trigger instruction to the second RF device when transmission of the RFFE data is completed, to enable the second RF device to execute the command information in the register according to the RFFE trigger instruction;
   wherein transmitting the RFFE data to the second RF device comprises:
   transmitting the command information to the second RF device after establishing a connection with the second RF device;
   transmitting data information comprised in the RFFE data to the second RF device after transmission of the command information is completed;
   wherein transmitting the RFFE trigger instruction to the second RF device when the transmission of the RFFE data is completed to enable the second RF device to execute the command information in the register according to the RFFE trigger instruction comprises:
   transmitting notification information to the second RF device when the transmission of the RFFE data is completed, and receiving feedback information transmitted by the second RF device in response to the notification information, wherein the feedback information indicates that reception of the RFFE data is completed;
   transmitting the RFFE trigger instruction to the second RF device after receiving the feedback information transmitted by the second RF device, wherein the RFFE trigger instruction is used to enable the second RF device to control the register to execute the command information;
   wherein the information processing method for the RF device further comprises:
   transmitting the RFFE trigger instruction to the second RF device again after a preset time interval since the RFFE trigger instruction has been transmitted to the second RF device.

2. A computer-readable storage medium storing therein a computer program, wherein the computer program is configured to be executed by a processor, to implement the information processing method for the RF device according to claim 1.

3. An information processing method for a RF device, wherein the information processing method is applied to a second RF device and comprises:
   receiving RFFE data transmitted by a first RF device, wherein the RFFE data comprises command information to be written to a corresponding register in the second RF device;
   receiving an RFFE trigger instruction transmitted by the first RF device when reception of the REFE data is completed, and executing the command information in the register according to the RFFE trigger instruction;
   wherein receiving the RFFE data transmitted by the first RF device comprises:
   receiving the command information transmitted by the first RF device after establishing a connection with the first RF device, and writing the command information into the register;
   receiving data information comprised in the RFFE data transmitted by the first RF device after the reception of the command information is completed;
   wherein receiving the RFFE trigger instruction transmitted by the first RF device when the reception of the REFE data is completed, and executing the command information in the register according to the RFFE trigger instruction comprises:
   receiving notification information transmitted by the first RF device when the reception of the REFE data is completed, and transmitting feedback information to the first RF device, wherein the feedback information is in response to the notification information and indicates that reception of the RFFE data is completed;

receiving the RFFE trigger instruction transmitted by the first RF device after transmitting the feedback information to the first RF device, and controlling the register to execute the command information according to the RFFE trigger instruction;

wherein the information processing method for the RF device further comprises:

receiving the RFFE trigger instruction transmitted by the first RF device again after preset time interval since the RFFE trigger instruction transmitted by the first RF device has been received and the command information in the register has been executed according to the RFFE trigger instruction.

4. A mobile terminal, comprising: a processor, a memory, and a computer program stored in the memory and capable of being executed by the processor, wherein the mobile terminal further comprises a second RF device, and the processor is configured to execute the computer program to implement the information processing method for the RF device according to claim 3.

5. A mobile terminal, comprising: a processor, a memory, and a computer program stored in the memory and capable of being executed by the processor, wherein the processor is configured to execute the computer program to transmit an RFFE data to a second RF device, wherein the RFFE data comprises command information to be written to a corresponding register in the second RF device;

transmit an RFFE trigger instruction to the second RF device when transmission of the RFFE data is completed, to enable the second RF device to execute the command information in the register according to the RFFE trigger instruction;

wherein the processor is further configured to execute the computer program to:

transmit the command information to the second RF device after establishing a connection with the second RF device;

transmit data information comprised in the RFFE data to the second RF device after transmission of the command information is completed;

wherein the processor is further configured to execute the computer program to:

transmit notification information to the second RF device when the transmission of the RFFE data is completed, and receive feedback information transmitted by the second RF device in response to the notification information, wherein the feedback information indicates that reception of the RFFE data is completed;

transmit the RFFE trigger instruction to the second RF device after receiving the feedback information transmitted by the second RF device, wherein the RFFE trigger instruction is used to enable the second RF device to control the register to execute the command information;

wherein the processor is further configured to execute the computer program to:

transmit the RFFE trigger instruction to the second RF device again after a preset time interval since the RFFE trigger instruction has been transmitted to the second RF device.

* * * * *